United States Patent
Yoshida et al.

(10) Patent No.: US 12,536,688 B2
(45) Date of Patent: Jan. 27, 2026

(54) POSTURE DETECTION APPARATUS, POSTURE DETECTION METHOD, AND SLEEPING POSTURE DETERMINATION METHOD

(71) Applicant: Shimadzu Corporation, Kyoto (JP)

(72) Inventors: Koki Yoshida, Kyoto (JP); Kahori Kise, Kyoto (JP); Koichi Murata, Kyoto (JP); Nobuya Hashizume, Kyoto (JP); Masafumi Furuta, Kyoto (JP); Shima Okada, Kusatsu (JP)

(73) Assignee: SHIMADZU CORPORATION, Kyoto (JP)

( * ) Notice: Subject to any disclaimer, the term of this patent is extended or adjusted under 35 U.S.C. 154(b) by 305 days.

(21) Appl. No.: 18/029,878

(22) PCT Filed: Jul. 7, 2021

(86) PCT No.: PCT/JP2021/025599
§ 371 (c)(1),
(2) Date: Mar. 31, 2023

(87) PCT Pub. No.: WO2022/074886
PCT Pub. Date: Apr. 14, 2022

(65) Prior Publication Data
US 2023/0368408 A1     Nov. 16, 2023

(30) Foreign Application Priority Data
Oct. 5, 2020   (JP) .................. 2020-168200

(51) Int. Cl.
*G06T 7/70*   (2017.01)
*G06V 10/62*   (2022.01)
(Continued)

(52) U.S. Cl.
CPC ............... *G06T 7/70* (2017.01); *G06V 10/62* (2022.01); *G06V 10/70* (2022.01); *G06V 40/10* (2022.01);
(Continued)

(58) Field of Classification Search
None
See application file for complete search history.

(56) References Cited

U.S. PATENT DOCUMENTS

| 2013/0230211 A1* | 9/2013 | Tanabiki | G06T 7/75 |
| | | | 382/103 |
| 2018/0300538 A1* | 10/2018 | Horie | G06V 20/52 |
| 2020/0042826 A1* | 2/2020 | Ishikawa | G06V 20/56 |

FOREIGN PATENT DOCUMENTS

| CN | 101401124 A | 4/2009 |
| CN | 107735813 A | 2/2018 |

(Continued)

OTHER PUBLICATIONS

Extended European Search Report dated Oct. 21, 2024 for corresponding application No. EP 21 87 7190.
(Continued)

*Primary Examiner* — Delomia L Gilliard
(74) *Attorney, Agent, or Firm* — Muir Patent Law, PLLC

(57) ABSTRACT

A position estimator outputs, by inputting information obtained from the frame images into a trained model, positional information of a plurality of parts of a human body from the trained model. A determination processor outputs information on erroneous detection by the position estimator. The position estimator outputs a first position group in response to an input of an obtained first frame image, the first frame image being obtained by the receiver and outputs a second position group in response to an input of an obtained second frame image different from the first frame image, the second frame image being obtained by the
(Continued)

receiver. The determination processor outputs the information on erroneous detection by the position estimator based on a degree of difference between the first position group and the second position group and a degree of matching between the first frame image and the second frame image.

10 Claims, 15 Drawing Sheets

(51) Int. Cl.
*G06V 10/70* (2022.01)
*G06V 40/10* (2022.01)

(52) U.S. Cl.
CPC ............... *G06T 2207/20081* (2013.01); *G06T 2207/30196* (2013.01)

(56) References Cited

FOREIGN PATENT DOCUMENTS

| | | |
|---|---|---|
| CN | 111507176 A | 8/2020 |
| JP | 2018180894 A | 11/2018 |
| WO | 2014034035 A1 | 3/2014 |

OTHER PUBLICATIONS

Cao et al., OpenPose: "Realtime Multi-Person 2D Pose Estimation using Part Affinity Fields", CVPR, arXiv:1611.08050v2[cs.CV] 2017.
PCT Written Opinion of the International Searching Authority (Form PCT/ISA/237), for PCT application No. PCT/JP2021/025599 dated Sep. 21, 2021.
Chinese Office Action dated Jul. 12, 2025 for corresponding application No. 202180067926.0.

* cited by examiner

POSTURE DETECTION APPARATUS, POSTURE DETECTION METHOD, AND SLEEPING POSTURE DETERMINATION METHOD

TECHNICAL FIELD

The present invention relates to a posture detection apparatus, a posture detection method, and a sleeping posture determination method.

BACKGROUND ART

A posture detection (which is also referred to as "posture estimation") technique by means of machine learning has recently rapidly been developed. The posture detection technique by means of machine learning refers to a technique to detect a person included in a single image, to detect positional information of a plurality of parts of a human body, and further to find lines that connect such parts and show the lines as being superimposed on an original image. The parts of the human body include, for example, a knee, an elbow, a wrist, and an ankle. By adopting this technique, a marker does not have to be attached to a human body as in conventional motion capture. A technique using an algorithm called OpenPose has been available as one of such techniques (NPL 1). With the use of OpenPose, a posture can be detected in real time in moving images shot with a general monocular camera. With this technique as a springboard, the posture detection technique by means of machine learning has started attracting attention. The posture detection technique by means of machine learning has increasingly been applied in various fields such as sports, medical care, and security.

CITATION LIST

Non Patent Literature

NPL 1: Zhe Cao et al (2017), OpenPose: Realtime Multi-Person 2D Pose Estimation using Part Affinity Fields, CVPR

SUMMARY OF INVENTION

Technical Problem

With the posture detection technique by means of machine learning, however, positional information of a plurality of parts of a human body included in an input image may erroneously be detected. In most of the posture detection techniques by means of machine learning including OpenPose, positional information is detected for each frame image in moving images and hence relation between frame images is not taken into consideration. Since a result of detection of positional information of a plurality of parts of a human body may be different between frame images in spite of the fact that there is no motion of the human body between the frame images, the difference may be detected as a motion of the human body. From the same cause, also in an example where there is a motion of the human body between frame images, positional information including the motion in a situation that can never actually occur may be detected. Thus, erroneous detection of positional information of a plurality of parts of a human body may lead to detection of an operation of the human body that does not actually occur in both of a case where there is a motion between frame images and a case where there is no motion between frame images.

The present disclosure was made to solve such problems, and an object of the present disclosure is to provide a technique that allows identification of erroneous detection of positional information of a plurality of parts of a human body.

Solution to Problem

A posture detection apparatus according to one aspect of the present disclosure includes a receiver, a position estimator, and a determination processor. The receiver obtains frame images on a time-series basis. The position estimator outputs, by inputting information obtained from the frame images into a trained model, positional information of a plurality of parts of a human body from the trained model. The determination processor outputs information on erroneous detection by the position estimator. The position estimator outputs a first position group in response to an input of an obtained first frame image, the first frame image being obtained by the receiver, and outputs a second position group in response to an input of an obtained second frame image different from the first frame image, the second frame image being obtained by the receiver. The determination processor outputs the information on erroneous detection by the position estimator based on a degree of difference between the first position group and the second position group and a degree of matching between the first frame image and the second frame image.

A posture detection method according to another aspect of the present disclosure includes obtaining frame images on a time-series basis, outputting, by inputting information obtained from the frame images into a trained model, positional information of a plurality of parts of a human body from the trained model, and outputting information on erroneous detection for the outputted positional information of the plurality of parts. The outputting positional information of a plurality of parts includes outputting a first position group when input of an obtained first frame image is received and outputting a second position group when input of an obtained second frame image different from the first frame image is received. The outputting the information on erroneous detection outputs information on the erroneous detection based on a degree of difference between the first position group and the second position group and a degree of matching between the first frame image and the second frame image.

A sleeping posture determination method according to another aspect of the present disclosure includes the posture detection method and outputting sleeping posture information based on outputted positional information of the plurality of parts and outputted information on the erroneous detection.

Advantageous Effects of Invention

According to the present disclosure, erroneous detection of positional information of a plurality of parts of a human body can be identified. Since the erroneously detected positional information can thus be eliminated, detection of an operation of the human body that did not actually occur can be prevented.

DESCRIPTION OF EMBODIMENTS

Figure 1:
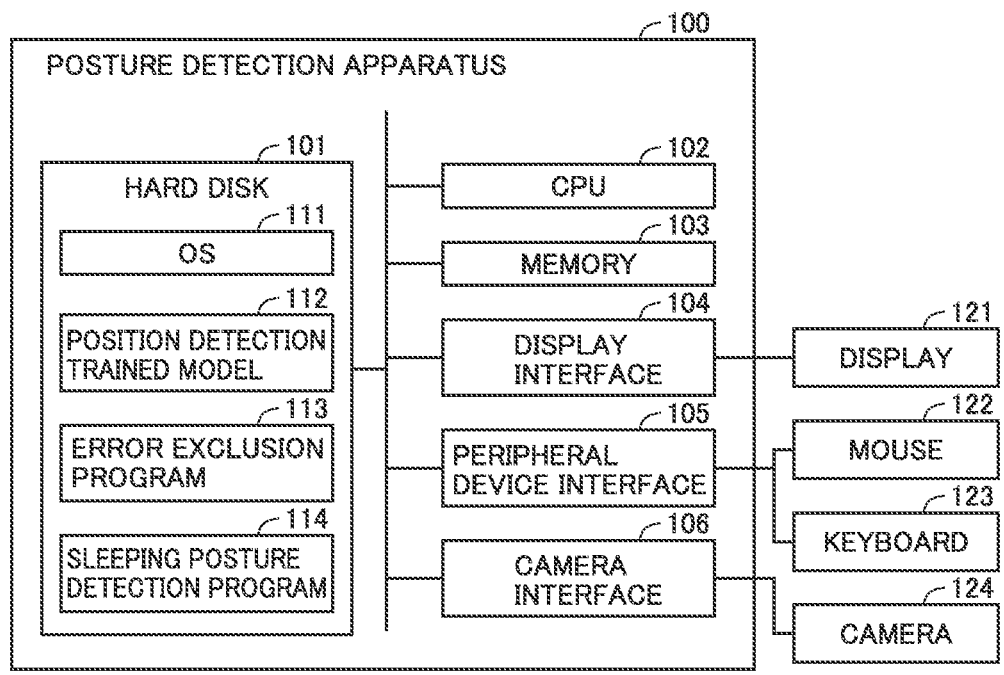
FIG. 1 is a schematic diagram showing an exemplary hardware configuration of a posture detection apparatus according to the present embodiment.

An embodiment of the present disclosure will be described in detail below with reference to the drawings. The same or corresponding elements in the drawings have the same reference characters allotted and description thereof will not be repeated.

[Hardware Configuration of Posture Detection Apparatus]

FIG. 1 is a schematic diagram showing an exemplary hardware configuration of a posture detection apparatus according to the present embodiment. As shown in FIG. 1, a posture detection apparatus 100 according to the present embodiment includes a hard disk 101, a central processing unit (CPU) 102, a memory 103, a display interface 104, a peripheral device interface 105, and a camera interface 106. These are connected to communicate with one another through a bus. Posture detection apparatus 100 includes a personal computer or a work station.

Hard disk 101 is a non-volatile storage. For example, an operating system (OS) 111, a position detection trained model 112, an error exclusion program 113, and a sleeping posture detection program 114 are stored in hard disk 101. Other than the data shown in the figure, a program or data for various types of processing is also stored in hard disk 101.

CPU 102 reads a program stored in hard disk 101 into memory 103 and executes the program to thereby perform various functions of posture detection apparatus 100. Memory 103 is a volatile storage and includes, for example, a dynamic random access memory (DRAM).

Position detection trained model 112 is a neural network model that outputs therefrom, by receiving input thereinto of information obtained from a frame image, positional information of a plurality of parts of a human body as a detection result (which is also referred to as a "position detection result" below). At that time, each pixel value obtained from a frame image or a feature value extracted from a frame image may be inputted. For example, OpenPose developed by Carnegie Mellon University (CMU), Human-pose-estimation developed by Microsoft, or poseNet developed by Google Corporation may be employed as position detection trained model 112.

Error exclusion program 113 is a program used at the time when an outputted position detection result is determined as being erroneous and correction is made by exclusion of the position detection result determined as being erroneous. In the present embodiment, detection of positional information of a plurality of parts of a human body is referred to as "posture detection." The positional information is a coordinate that allows identification of positions, for example, of a shoulder, an elbow, a wrist, and the like. The positional information may be a coordinate that allows identification of a position in another area that is calculated from coordinates that allow identification of positions of a plurality of areas. For example, the positional information may be a coordinate that allows identification of a position of a cheek area that is calculated from coordinates that allow identification of positions of eyes, the nose, and the mouth. The positional information is not limited to two-dimensional positional information but may be three-dimensional positional information. The three-dimensional positional information may be estimated from the two-dimensional positional information or may be measured with a stereo camera or a TOF camera.

Sleeping posture detection program 114 is a program used for output, by reception of input of the position detection result, of sleeping posture information as a detection result (which is also referred to as a "sleeping posture detection result" or a "sleeping posture determination result" below). The sleeping posture information includes, for example, face-up, face-down, face to the right, and face to the left. The positional information of the plurality of parts of the human body detected as the position detection result correlates with sleeping posture information. Sleeping posture detection program 114 is a program for estimation based on a model that defines correspondence in advance where the position detection result is provided as an input and sleeping posture information is provided as an output. Without being limited as such, sleeping posture information may be outputted with the use of a trained model by means of machine learning.

CPU 102 is connected to a display 121 with display interface 104 being interposed. CPU 102 is connected to a mouse 122 and a keyboard 123 with peripheral device interface 105 being interposed. CPU 102 is connected to a camera 124 with camera interface 106 being interposed.

Display interface 104 is an interface for connection of display 121, and realizes input and output of data between posture detection apparatus 100 and display 121. Display 121 is implemented, for example, by a liquid crystal display (LCD) or an organic electroluminescence (EL) display. Moving images shot by camera 124 and a result outputted by position detection trained model 112 or sleeping posture detection program 114 are shown on display 121.

Peripheral device interface 105 is an interface for connection of a peripheral device such as mouse 122 and keyboard 123 and realizes input and output of data between posture detection apparatus 100 and the peripheral device.

Camera interface 106 is an interface for connection of camera 124 and realizes input and output of data between posture detection apparatus 100 and camera 124.

CPU 102 may be configured to be connected to a network such as a local area network (LAN) with a communication interface being interposed. In this case, CPU 102 may be connected to camera 124 or display 121 over the network.

[Hardware Configuration of Posture Detection Apparatus]

Figure 2:
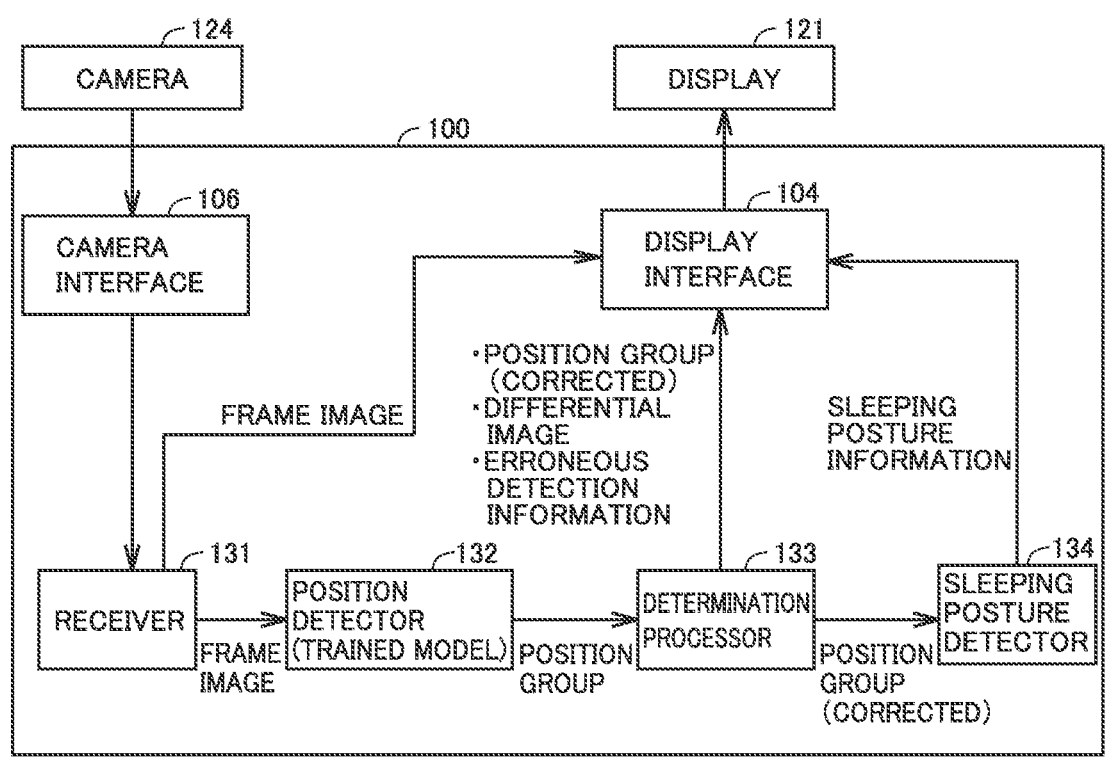
FIG. 2 is a block diagram showing an exemplary functional configuration of the posture detection apparatus.

FIG. 2 is a block diagram showing an exemplary functional configuration of the posture detection apparatus. As shown in FIG. 2, posture detection apparatus 100 includes, as a functional unit involved with detection processing, a receiver 131, a position detector 132, a determination processor 133, and a sleeping posture detector 134. Each of these functions is performed by execution of OS 111 and various programs by CPU 102 of posture detection apparatus 100.

Receiver 131 obtains frame images on a time-series basis. For example, frame images are images included in moving images obtained by shooting of a sleeping person. Specifically, camera 124 shoots a sleeping person and receiver 131 obtains on the time-series basis, frame images included in the shot moving images through camera interface 106. The moving images are not limited to those obtained by shooting a sleeping person. Moving images of a person who is awake or something that is not a person may be applicable.

Position detector 132 outputs, by inputting information obtained from frame images into the trained model (position detection trained model 112), positional information of a plurality of parts of a human body from the trained model as a position detection result. The positional information of the plurality of parts of the human body is also referred to as a "position group." The "position group" is also simply referred to as a "position".

Position detector 132 outputs a position group as the position detection result when it receives input of a frame image obtained by receiver 131. For example, position detector 132 outputs a first position group when it receives input of a first frame image obtained by receiver 131 and outputs a second position group when it receives input of a second frame image obtained by receiver 131. Determination processor 133 outputs information on erroneous detection by the position detector (which is also referred to as "erroneous detection information").

Furthermore, when determination processor 133 determines that the outputted position detection result is erroneous, with the use of error exclusion program 113, it makes correction by excluding the position detection result determined as being erroneous. The position group outputted by determination processor 133 is also referred to as a position group (corrected).

Sleeping posture detector 134 outputs sleeping posture information based on the position detection result with the use of sleeping posture detection program 114.

The frame images obtained by receiver 131 are transmitted to the display interface. An image that allows identification of the position group (corrected) outputted from determination processor 133, a differential image between a first frame image and a second frame image, an image that allows identification of erroneous detection information, or an image that allows identification of sleeping posture information outputted from sleeping posture detector 134 is transmitted to the display interface. These images can be shown on display 121.

Posture detection apparatus 100 is not limited to the posture detection apparatus including position detector 132, but an external device may include position detector 132 or an external device may perform some other functions. The external device may be connected over the network. Posture detection apparatus 100 does not have to include sleeping posture detector 134. An apparatus including sleeping posture detector 134 may be referred to as a sleeping posture determination apparatus and an apparatus not including sleeping posture detector 134 may be referred to as a posture detection apparatus.

[Flowchart of Detection Processing]

Figure 3:
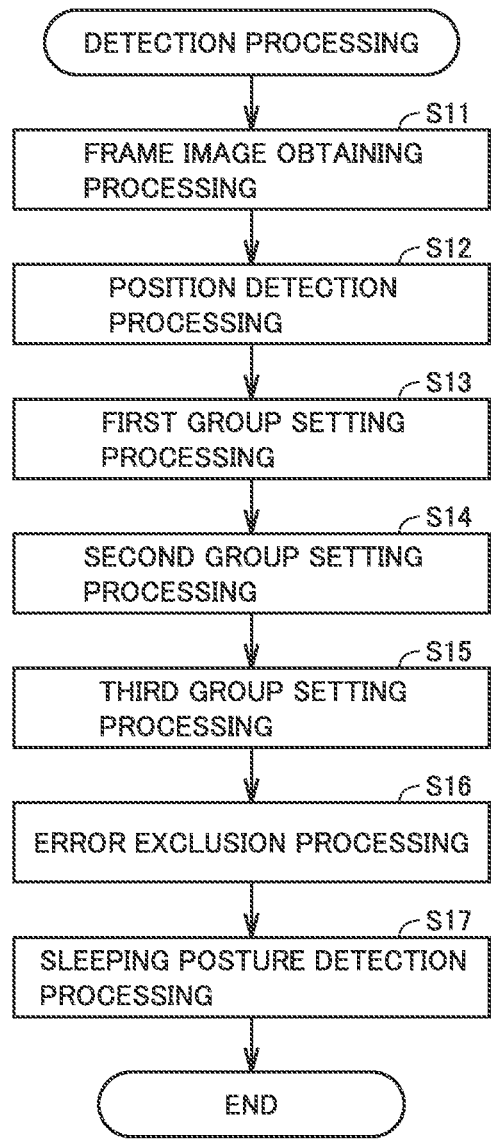
FIG. 3 is a flowchart showing exemplary detection processing.

FIG. 3 is a flowchart showing exemplary detection processing. As shown in FIG. 3, CPU 102 performs detection processing.

Detection processing is processing started at timing of generation of each frame image in moving images. A frame image obtained by receiver 131 in present detection processing is also referred to as a "presently obtained frame image" or a "second frame image" below. A frame image obtained by receiver 131 in previous detection processing is also referred to as a "previously obtained frame image" or a "first frame image." In the present detection processing, a position group outputted from position detector 132 is also referred to as a "second position group" and a position detection result outputted from position detector 132 is also referred to as a "present position detection result." In previous detection processing, a position group outputted from position detector 132 is also referred to as a "first position group" and a position detection result outputted from position detector 132 is also referred to as a "previous position detection result."

Receiver 131 does not have to obtain a frame image for each frame but may obtain a frame image every several frames or every time period defined in advance. A frame image included in moving images shot by camera 124 does not have to be obtained in real time but detection processing may be performed with the use of moving images stored in hard disk 101.

The detection processing is a series of processing performed by receiver 131, position detector 132, determination processor 133, and sleeping posture detector 134. The detection processing includes frame image obtaining processing, position detection processing, first group setting processing, second group setting processing, third group setting processing, error exclusion processing, and sleeping posture detection processing. In the detection processing, the sleeping posture detection processing does not have to be performed.

The frame image obtaining processing is processing performed by receiver 131. The position detection processing is processing performed by position detector 132 with the use of position detection trained model 112.

Determination processor 133 outputs information on erroneous detection by position detector 132. The first group setting processing, the second group setting processing, and the third group setting processing are processing performed by determination processor 133. Determination processor 133 performs the error exclusion processing with the use of error exclusion program 113. The sleeping posture detection processing is processing performed by sleeping posture detector 134 with the use of sleeping posture detection program 114. A step will simply be denoted as S below.

As the detection processing is started, in S11, CPU 102 performs the frame image obtaining processing and the process proceeds to S12. In the frame image obtaining processing, receiver 131 obtains frame images on the time-series basis. The frame images are, for example, images included in moving images obtained by shooting of a sleeping person.

In S12, CPU 102 performs the position detection processing and the process proceeds to S13. In the position detection processing, position detector 132 outputs, by inputting information obtained from frame images into the trained model (position detection trained model 112), positional information of a plurality of parts of a human body from the trained model as a position detection result.

In S13, CPU 102 performs the first group setting processing (FIG. 4) and the process proceeds to S14. In the first group setting processing, when a condition based on the obtained frame image is satisfied, determination processor 133 sets the presently obtained frame image as a first group.

In S14, CPU 102 performs the second group setting processing (FIG. 5) and the process proceeds to S15. In the second group setting processing, when a condition based on the position detection result is satisfied, determination processor 133 sets the presently obtained frame image as a second group.

In S15, CPU 102 performs the third group setting processing (FIG. 6) and the process proceeds to S16. In the third group setting processing, when a condition based on setting for the first group and the second group is satisfied, determination processor 133 sets the presently obtained frame image as a third group.

In S16, CPU 102 performs the error exclusion processing (FIG. 7) and the process proceeds to S17. In the error exclusion processing, when determination processor 133 sets the presently obtained frame image as the third group, it corrects the position detection result.

In S17, CPU 102 performs the sleeping posture detection processing and quits the detection processing. Receiving input of the position detection result, sleeping posture detector 134 makes determination as to the sleeping posture with the use of sleeping posture detection program 114 and outputs sleeping posture information (sleeping posture detection result).

The first group setting processing to the third group setting processing will be described below with reference to FIGS. 4 to 6. Overview of the processing performed here is as below. Position detector 132 outputs the first position group when it receives input of the first frame image obtained by receiver 131. Position detector 132 outputs the second position group when it receives input of the second frame image different from the first frame image that is obtained by receiver 131. The second frame image is an image obtained after the first frame image. The first frame image may be an image obtained after the second frame image.

Determination processor 133 outputs information on erroneous detection by position detector 132 based on the degree of difference between the first position group and the second position group and the degree of matching between the first frame image and the second frame image. In the present embodiment, when determination processor 133 determines that the first position group and the second position group are different from each other based on the degree of difference between the first position group and the second position group and determines that the first frame image and the second frame image match with each other based on the degree of matching between the first frame image and the second frame image, it outputs as information on erroneous detection by position detector 132, information that allows identification as erroneous detection of the second position group by position detector 132. Furthermore, determination processor 133 excludes the erroneously detected second position group from a result of output from position detector 132. Description will be given below with reference to a flowchart.

Figure 4:
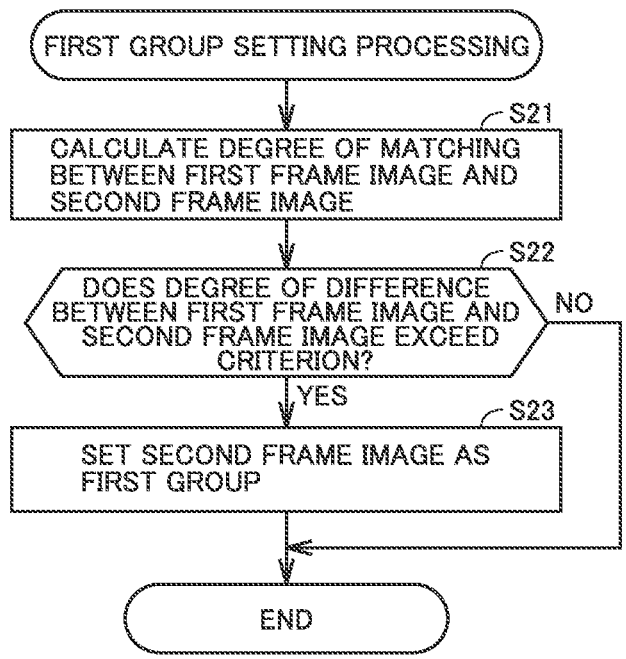
FIG. 4 is a flowchart showing exemplary first group setting processing.

FIG. 4 is a flowchart showing exemplary first group setting processing. Posture detection apparatus 100 includes a first calculator and a second calculator. The first calculator calculates the degree of difference between the first position group and the second position group. The second calculator calculates the degree of matching between the first frame image and the second frame image. For example, the degree of matching between the first frame image and the second frame image may be calculated as below. A difference of each pixel between the first frame image and the second frame image is taken. The number of pixels where there is a difference is counted and calculated as the degree of difference, and the number of pixels where there is no difference is counted and calculated as the degree of matching. A ratio of the number of pixels where there is a difference to the total number of pixels may be calculated as the degree of difference and a ratio of the number of pixels where there is no difference to the total number of pixels may be calculated as the degree of matching.

Determination processor 133 classifies the second frame image as the second frame image in the first group based on the degree of difference between the first frame image and the second frame image. Specifically, when the first group setting processing is started, in S21, the second calculator calculates the degree of matching between the previously obtained frame image (first frame image) and the presently obtained frame image (second frame image) and the process proceeds to S22. At that time, a differential image that allows identification of the difference between the first frame image and the second frame image is generated based on the difference between the first frame image and the second frame image.

In S22, when the degree of difference between the first frame image and the second frame image exceeds a predetermined criterion (YES in S22), determination processor 133 has the process proceed to S23. The process may proceed to S23 when the degree of matching between the first frame image and the second frame image is equal to or lower than the predetermined criterion.

In S22, when the degree of difference between the first frame image and the second frame image does not exceed the predetermined criterion (NO in S22), determination processor 133 quits the first group setting processing. The process may proceed to S23 when the degree of matching between the first frame image and the second frame image is not equal to or lower than the predetermined criterion.

In S23, determination processor 133 sets the second frame image (presently obtained frame image) as the first group and quits the first group setting processing. In the present processing, when it can be determined that there are few pixels different between the first frame image and the second frame image (the degree of difference does not exceed the predetermined criterion or the degree of matching is not equal to or lower than the predetermined criterion), the first frame image and the second frame image are determined as matching with each other. Then, when the first frame image and the second frame image are determined as not matching with each other (being different from each other), the second frame image (presently obtained frame image) is set as the first group.

The second calculator does not have to calculate the degree of matching or the degree of difference between the first frame image and the second frame image, and determination processor 133 does not have to determine whether or not the first frame image and the second frame image are different from each other. In this case, a person may visually check the first frame image and the second frame image to determine whether or not the first frame image and the second frame image are different from each other.

In other words, without the first group setting processing by determination processor 133, one may do visual checking and manually perform operations to set the frame image as the first position group. Alternatively, one may visually check a differential image and manually perform operations to set the frame image as the first group. In this case, setting as the first group can be made by an external input with the use of mouse 122 or keyboard 123.

Figure 5:
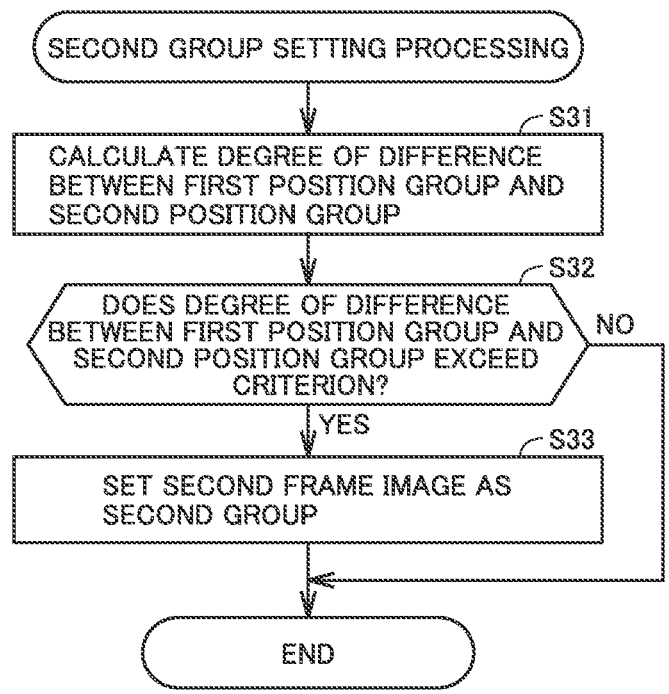
FIG. 5 is a flowchart showing exemplary second group setting processing.

FIG. 5 is a flowchart showing exemplary second group setting processing. Determination processor 133 classifies the second frame image inputted to position detector 132 for output of the second position group as the second frame image in the second group based on the degree of difference between the first position group and the second position group.

For example, the degree of difference between the first position group and the second position group may be calculated as below. An amount of movement of a position of each part from the first position group to the second position group is calculated. When a coordinate that allows identification of a first position of a certain part is (X1, Y1) and a coordinate that allows identification of a second position thereof is (X2, Y2), an amount of movement between the first position and the second position is calculated. Then, the total amount of movement of each part is calculated as the degree of difference.

When the second group setting processing is started, in S31, the first calculator calculates the degree of difference between a previous detection result (first position group) and a present detection result (second position group) and the process proceeds to S32.

In S32, when the degree of difference between the first position group and the second position group exceeds a predetermined criterion (YES in S32), determination processor 133 has the process proceed to S33. In S32, when the degree of difference between the first position group and the second position group does not exceed the predetermined criterion (NO in S32), determination processor 133 quits the second setting processing.

In S33, determination processor 133 classifies the second frame image (presently obtained frame image) inputted to the position detector for output of the second position group as the second frame image in the second group and quits the second setting processing. In the present processing, when it can be determined that there has been substantially no movement between the first position group and the second position group (the degree of difference does not exceed the predetermined criterion), the first position group and the second position group are determined as matching with each other. Then, when the first position group and the second position group are determined as not matching with each other (being different from each other), the second frame image (presently obtained frame image) is set as the second group.

Without being limited to calculation of the total amount of movement of each part as the degree of difference, the degree of difference may be calculated for each part and determination as to the difference may be made for each part. In such a case, whether or not a detection result for each part is erroneous can be determined based on comparison with the differential image corresponding to each part. Alternatively, with attention being paid to a plurality of positions such as the right elbow and the right wrist, for example, whether or not a detection result associated with the right hand is erroneous may be determined.

The first calculator does not have to calculate the degree of matching or the degree of difference between the first position group and the second position group and determination processor 133 does not have to determine whether or not the first position group and the second position group are different from each other based on a result of calculation by the first calculator. In this case, one may visually check the first position group and the second position group to determine whether or not the first position group and the second position group are different from each other.

In other words, without the second group setting processing by determination processor 133, one may do visual checking and manually perform operations to set the frame image as the second group. Alternatively, one may visually check the differential image and manually perform operations to set the frame image as the second group. In this case, setting as the second group can be made by an external input with the use of mouse 122 or keyboard 123.

Determination processor 133 outputs information on erroneous detection by position detector 132 based on the degree of difference between the first position group and the second position group and the degree of matching between the first frame image and the second frame image. Specifically, when determination processor 133 determines that the first position group and the second position group are different from each other based on the degree of difference between the first position group and the second position group and determines that the first frame image and the second frame image match with each other based on the degree of matching (or the degree of difference) between the first frame image and the second frame image, determination processor 133 outputs as the information on erroneous detection by position detector 132, information that allows identification of erroneous detection of the second position group by position detector 132. This determination is such that, in spite of absence of a motion of a person between frame images, the detection result exhibits change of positions of a plurality of parts of the human body and hence the detection result is determined as being erroneous.

Determination processor 133 outputs as the information on erroneous detection by position detector 132, information that allows identification of erroneous detection of the second position group by position detector 132 also when the degree of difference between the first position group and the second position group at at least one part of a plurality of parts exceeds the predetermined criterion. This processing is such that, the detection result exhibits change of a position of a part of the human body at a speed impossible as the motion of a person within a period from shooting of the first frame image until shooting of the second frame image and hence the detection result is determined as being erroneous. For example, a case in which only the wrist varies at an impossible speed or a case in which the whole body (all parts) instantaneously moves may be applicable. The degree of difference between the first position group and the second position group may be expressed as an amount of movement for each part. Erroneous detection of the second position group should only be identified when an amount of movement at at least one part exceeds the predetermined criterion.

Determination processor 133 excludes the erroneously detected second position group from the result of output from position detector 132 (discards the position detection result). Then, determination processor 133 changes the erroneously detected second position group to positional information the same as that of the first position group. Such processing is performed in the third group setting processing and the error exclusion processing. Specific description will be given below with reference to a flowchart.

Figure 6:
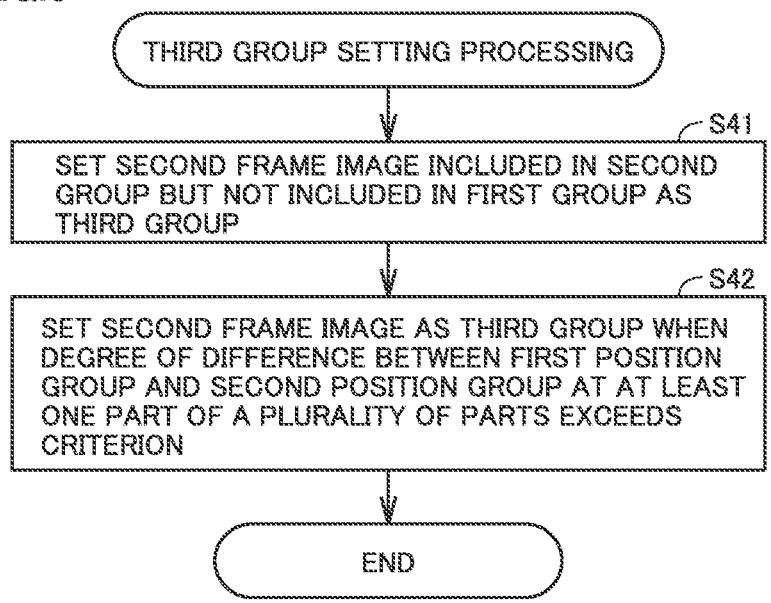
FIG. 6 is a flowchart showing exemplary third group setting processing.

FIG. 6 is a flowchart showing exemplary third group setting processing. Determination processor 133 classifies the second frame image included in the second group but not included in the first position group as the second frame image in the third group and identifies that second frame image as the second frame image for which position detector 132 erroneously detected the second position group.

When the third group setting processing is started, in S41, determination processor 133 sets the second frame image (presently obtained frame image) included in the second group but not included in the first group as the second frame image in the third group and the process proceeds to S42. The frame image set as the third group is the frame image for which position detector 132 erroneously detected the second position group.

In S42, when the degree of difference between the previous detection result (first position group) and the present detection result (second position group) at at least one part of a plurality of parts exceeds the predetermined criterion, determination processor 133 sets the second frame image (presently obtained frame image) as the third group and quits the third group setting processing.

Figure 7:
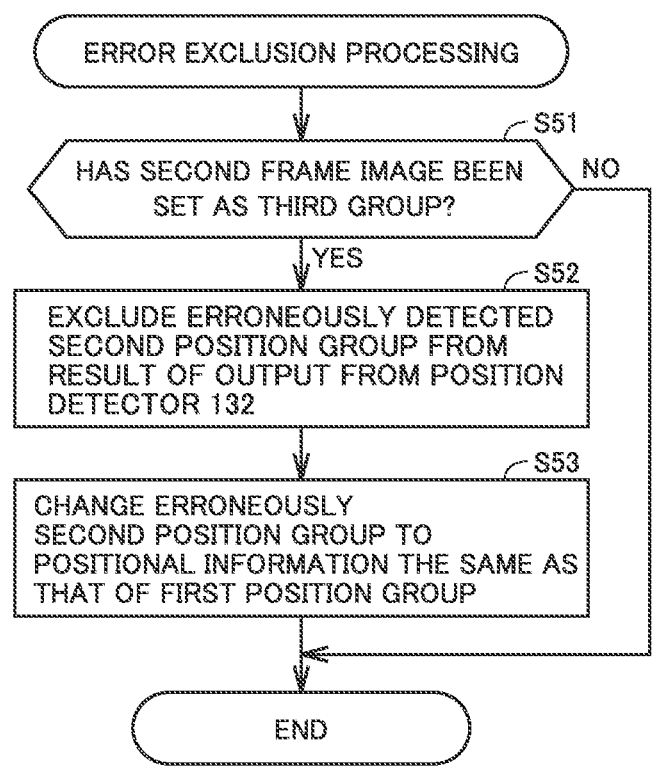
FIG. 7 is a flowchart showing exemplary error exclusion processing.

FIG. 7 is a flowchart showing exemplary error exclusion processing. As the error exclusion processing is started, in S51, when the presently obtained frame image (second frame image) is set as the third group (YES in S51), determination processor 133 has the process proceed to S52.

In S51, when the presently obtained frame image is not set as the third group (NO in S51), determination processor 133 quits the error exclusion processing. In S52, determination processor 133 excludes the erroneously detected second position group (present position detection result) from the result of output from position detector 132 and the process proceeds to S53.

In S53, determination processor 133 changes the erroneously detected second position group (present position detection result) to positional information the same as that of the first position group (previous position detection result) and quits the error exclusion processing. In other words, since the present position detection result is erroneous, the previous position detection result is used as the present position detection result.

For example, when at least one position of positions of a plurality of parts of the human body outputted as the position detection result is determined as being different, the present position detection result may be excluded. In this case, the present position detection result including also a correctly detected position is excluded and the previous position detection result is used. Alternatively, only the position determined as being different may be excluded from the present position detection result. In this case, the previous position detection result is used, with the correctly detected position not being excluded from the present position detection result but only the erroneously detected position being excluded from the present position detection result.

Without the third group setting processing by determination processor 133, one may visually check the difference between the frame images or an amount of change in the position detection result and manually perform operations to set the frame image as the third group. In this case, setting as the third group can be made by an external input with the use of mouse 122 or keyboard 123.

Alternatively, both of S52 and S53 do not have to be performed but any one of them may be performed. When only processing (S52) for excluding the erroneously detected second position group (present position detection result) from the result of output from position detector 132 is performed, the present position detection result no longer exists. Therefore, the sleeping posture cannot be detected based on the present position detection result. In this case, the sleeping posture should only be detected based on preceding and subsequent results of correct position detection.

Receiving input of the position detection result, sleeping posture detector 134 makes determination as to the sleeping posture with the use of sleeping posture detection program 114 and outputs sleeping posture information (sleeping posture detection result). In the detection processing, processing in S11 to S16 is processing for outputting positional information (position detection result) of a plurality of parts of the human body or information on erroneous detection (erroneous detection of the second position group). Furthermore, in processing in S17, sleeping posture information (sleeping posture detection result) is outputted based on the outputted positional information of the plurality of parts and the outputted information on erroneous detection. Specifically, the erroneously detected second position group is excluded or changed based on the information on erroneous detection, and then the positional information of the plurality of parts is inputted and the sleeping posture information is outputted.

Figure 8:
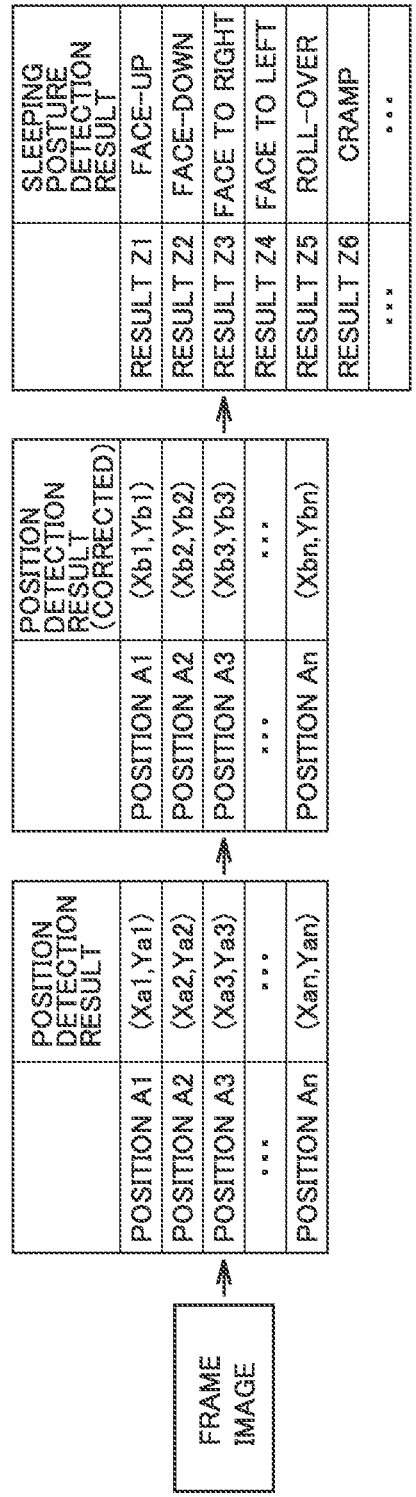
FIG. 8 is a diagram showing exemplary input and output data in detection processing.

FIG. 8 is a diagram showing exemplary input and output data in detection processing. Receiver 131 obtains a frame image included in moving images obtained by shooting of a sleeping person. As shown in FIG. 8, position detector 132 outputs, by inputting information obtained from the frame image into position detection trained model 112, positional information (position group) of a plurality of parts of the human body from the trained model as the position detection result.

Position detector 132 outputs positions of n parts of the human body as the position detection result. In the present embodiment, n is set to n=23. The positions of n parts of the human body are denoted as a position A1, a position A2, a position A3, . . . , and a position An below. These positions each represent a position of each joint or a specific position in a face. For example, positions of joints represent positions of joints of left and right knees and elbows. Specific positions in the face represent positions of eyes, the nose, and ears.

A position of a part of the human body is expressed as a coordinate (X, Y) that allows identification of a position for representation on display 121. The coordinate corresponds to a position of a part of the human body in a frame image. For example, a coordinate that allows identification of a position of the right elbow is detected in correspondence with the right elbow in the frame image. An image that allows identification of such a position and an image of a line that connects positions to each other are generated as a position image. The position image is shown on display 121 as being superimposed on the front surface side of the image of a person in the frame image.

For example, position detector 132 outputs a coordinate (Xa1, Ya1) that allows identification of position A1 as the position detection result. Position detector 132 outputs a coordinate (Xa2, Ya2) that allows identification of position A2 as the position detection result. Position detector 132 outputs a coordinate (Xa3, Ya3) that allows identification of position A3 as the position detection result. Position detector 132 outputs a coordinate (Xan, Yan) that allows identification of position An as the position detection result.

Determination processor 133 performs the error exclusion processing. When determination processor 133 determines in the error exclusion processing that the position detection result is erroneous (identifies erroneous detection of the second position group), it corrects the position detection result. The position detection result is thus changed to the position detection result (corrected). When determination processor 133 does not determine in the error exclusion processing that the position detection result is erroneous, it does not change the position detection result.

For example, position detector 132 outputs a coordinate (Xb1, Yb1) that allows identification of position A1 as the position detection result (corrected). Position detector 132 outputs a coordinate (Xb2, Yb2) that allows identification of position A2 as the position detection result (corrected). Position detector 132 outputs a coordinate (Xb3, Yb3) that allows identification of position A3 as the position detection result (corrected). Position detector 132 outputs a coordinate (Xbn, Ybn) that allows identification of position An as the position detection result (corrected).

For example, since determination processor 133 does not determine the position detection result as being erroneous in a frame image A in FIG. 12 which will be described later, coordinates that allow identification of A1 to An are not changed. In frame image B in FIG. 12, coordinates that allow identification of all positions (positions A1 to An) are changed. In frame image B in FIG. 13, coordinates that allow identification of the right elbow and the right wrist are changed.

When the position detection result is not determined as being erroneous, receiving input of the position detection result, sleeping posture detector 134 outputs sleeping posture information (sleeping posture detection result). When the position detection result is determined as being erroneous, receiving input of the position detection result (corrected), sleeping posture detector 134 outputs sleeping posture information (sleeping posture detection result).

The outputted sleeping posture detection result refers to a state (sleeping posture) while a person sleeps, such as face-up, face-down, face to the right, and face to the left. Sleeping posture detector 134 may detect an operation while a person sleeps such as roll-over or cramp from a plurality of successive position detection results and output the operation as the sleeping posture detection result.

Any sleeping posture detection result may be outputted so long as a condition of health of a person can be checked based thereon. For example, information that allows identification of frequent sway of the body, roll-over, twitch of a part of the body, thrashing of legs, or sleeping in an unnatural posture as a symptom exhibited during sleeping may be outputted.

Position detector 132 outputs any of results Z1 to Zm as the sleeping posture detection result. For example, result Z1 represents "face-up". Result Z2 represents "face-down". Result Z3 represents "face to the right." Result Z4 represents "face to the left." Result Z5 represents "roll-over". Result Z6 represents "cramp".

In the present embodiment, characters that allow identification of the sleeping posture detection result are shown on display 121. For example, together with moving images (frame images) obtained by shooting of a person who sleeps with his/her face up, characters "face-up" are shown on display 121. Alternatively, together with moving images (frame images) obtained by shooting of a person who feels a cramp, characters "cramp" are shown on display 121. The posture or the operation of a sleeping person can be checked by looking at display 121.

In the present embodiment, determination processor 133 corrects the present position detection result determined as being erroneous based on the degree of difference between the first position group and the second position group and the degree of matching between the first frame image and the second frame image. In other words, when the difference in the result of detection between frames is found in spite of absence of a motion of the human body, the position detection result is determined as being erroneous and the error is corrected. According to the posture detection technique (posture estimation technique) such as Openpose, a detection result is outputted based on a single frame. In contrast, in the present embodiment, improvement in detection accuracy in position detection is attempted with attention being paid to the difference in image between frames. In the present embodiment, attention is paid in particular to a sleeping state of a person, and in this case, motion of a person's body is very little. Thus, in the present embodiment, improvement in detection accuracy in position detection result is attempted in a situation where a difference between frame images is less likely to occur. Accuracy in detection of a sleeping posture can thus also be improved at the same time, and a condition of health while a person sleeps can appropriately be checked.

[Exemplary Representation of Detection Result]

Figure 9:
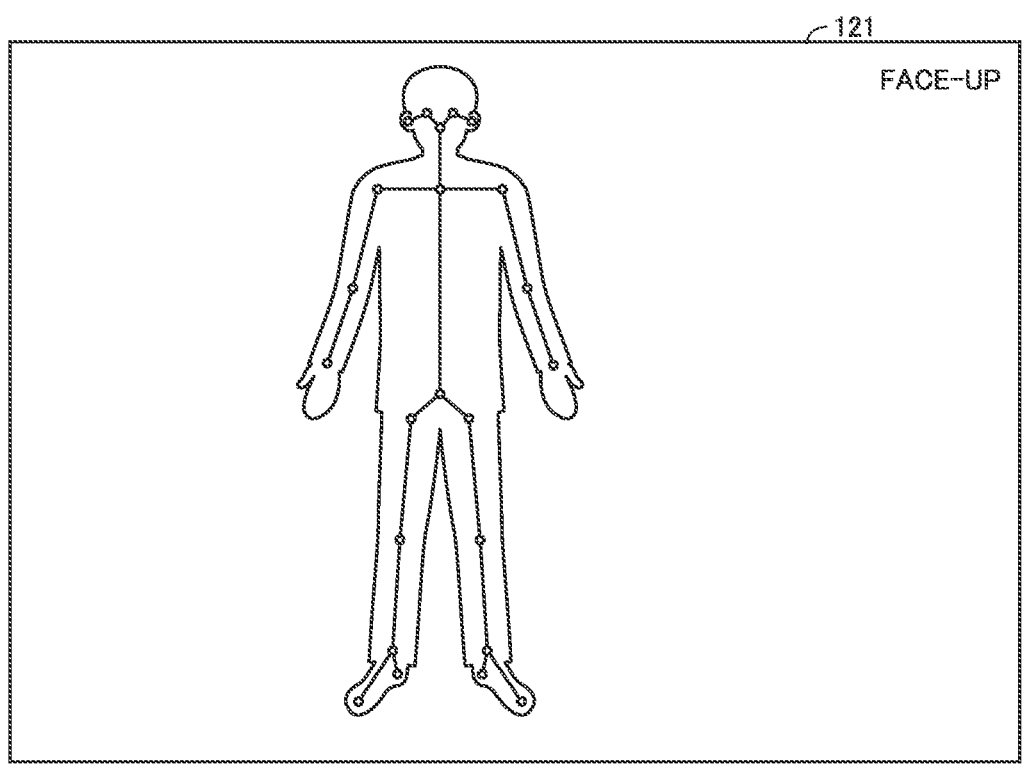
FIG. 9 is a diagram showing exemplary representation of a result of detection.

FIGS. 9 to 14 are each a diagram showing exemplary representation of a result of detection. FIG. 9 shows exemplary representation of a position detection result and a sleeping posture detection result when a person sleeps with his/her face up. As shown in FIG. 9, a frame image shot with camera 124 is shown on display 121. A shot person sleeps with his/her face up, and an image (frame image) of the person who sleeps with his/her face up is shown on display 121.

Position detector 134 outputs positions of n (23 in the present embodiment) parts of the human body as the position detection result. When the position detection result is determined as being erroneous, the position detection result is corrected. The position image generated based on the position detection result is shown on display 121 as being superimposed on the front surface side of the image of the person in the frame image.

Receiving input of the position detection result, sleeping posture detector 132 outputs sleeping posture information as the sleeping posture detection result. Characters that allow identification of the sleeping posture detection result are shown on display 121.

In the example in FIG. 9, on display 121, the position image on a front surface side of the image of the person who sleeps with his/her face up is shown. For example, an image that allows identification of the right ear, the right eye, the nose, the left eye, and the left ear is shown as the position image and a line connecting them to one another is shown. For example, an image that allows identification of the right shoulder, the right elbow, and the right wrist is shown as the position image and a line connecting them to one another is shown. Since positions are correctly detected, the position image is shown in correspondence with each position of the part of the human body in the frame image.

In an upper right portion of display 121, a character image "face-up" indicating sleeping with one's face up is shown as the sleeping posture detection result.

Figure 10:
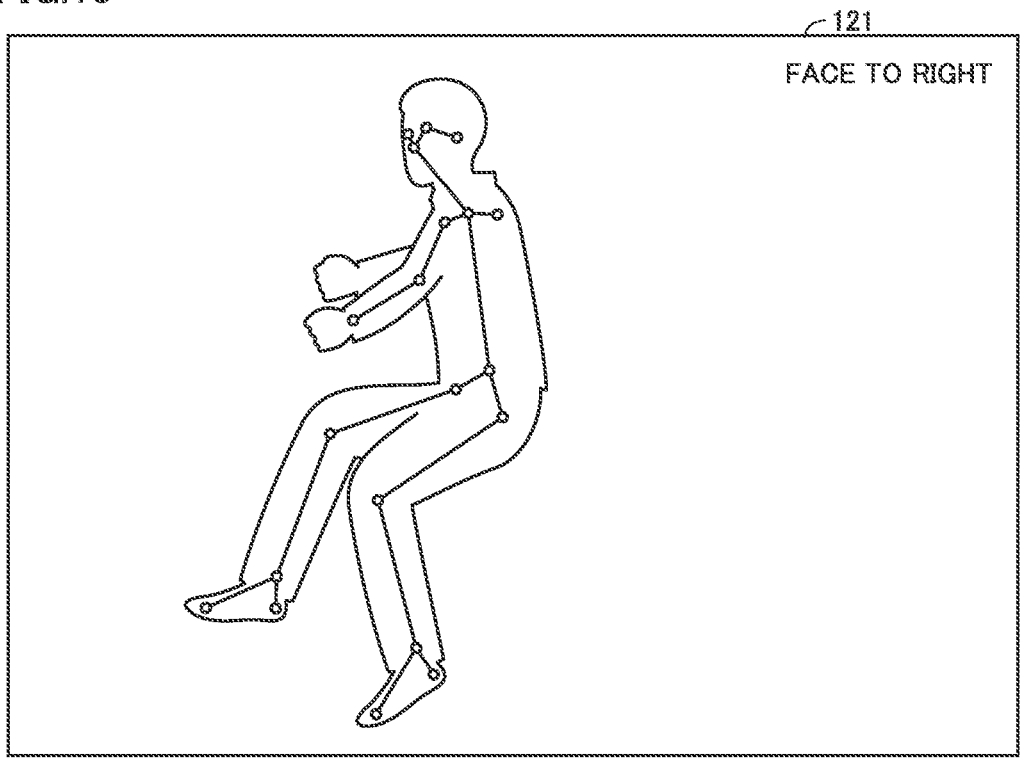
FIG. 10 is a diagram showing exemplary representation of a result of detection.

FIG. 10 shows exemplary representation of the position detection result and the sleeping posture detection result while a person sleeps with his/her face turning to the right. As shown in FIG. 10, a frame image shot with camera 124 is shown on display 121. A shot person sleeps with his/her face turning to the right, and an image (frame image) of the person who sleeps with his/her face turning to the right is shown on display 121.

In the example in FIG. 10, on display 121, a position image is shown as the position detection result as being superimposed on an image of the person who sleeps with his/her face turning to the right. In the upper right portion of display 121, a character image "face to the right" indicating sleeping with one's face turning to the right is shown as the sleeping posture detection result.

Since positions are correctly detected also in the example in FIG. 10, a position image is shown in correspondence with each position of the part of the human body in the frame image. The right arm in the image, however, is hidden and not seen. Therefore, positions of the right elbow and the right wrist are not shown as the detection result.

Figure 11:
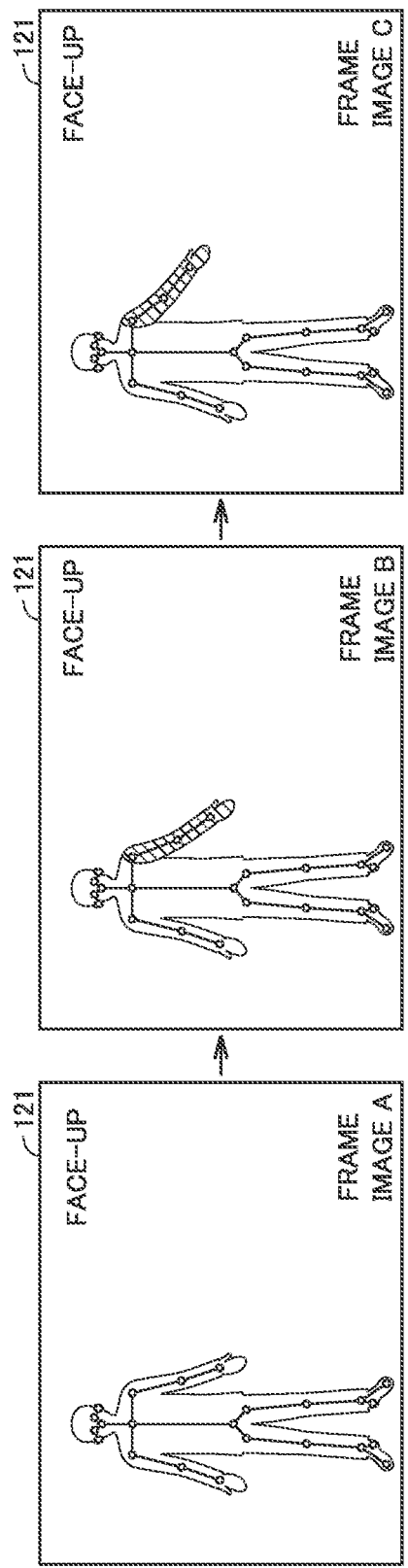
FIG. 11 is a diagram showing exemplary representation of a result of detection.

FIG. 11 shows exemplary representation of a detection result when the left arm and hand of a person who sleeps with his/her face-up gradually move. In FIG. 11, it is assumed that images are obtained on the time-series basis in the order of a frame image A, frame image B, and a frame image C. This is also applicable to FIGS. 12 to 14 below. As in FIG. 9, as shown in FIG. 11, an image of the person who sleeps with his/her face up, the position image, and the character image "face-up" are shown as frame image A on display 121.

In frame image B obtained next, the left arm and hand of the person are assumed to have moved upward. In this case, upward movement of the left arm and hand is shown in the image of the person who sleeps with his/her face turning upward on display 121. As a result of movement of the left arm and hand, a differential image that allows identification of movement of the left arm and hand is generated.

For example, an image is shown as the differential image, in which a region where change between frame images occurred is shown with a particular color (for example, yellow). In frame image B, a region corresponding to the right arm and hand is colored yellow. Furthermore, the position image and the character image "face-up" are shown.

In frame image C obtained next, the left arm and hand of the person are assumed to have further moved upward. In this case, further movement upward of the left arm and hand is shown on display 121. As a result of movement of the left arm and hand, a differential image that allows identification of movement of the left arm and hand is generated. In the figure, the region corresponding to the left arm and hand is colored yellow. Furthermore, the position image and the character image "face-up" are shown.

Figure 12:
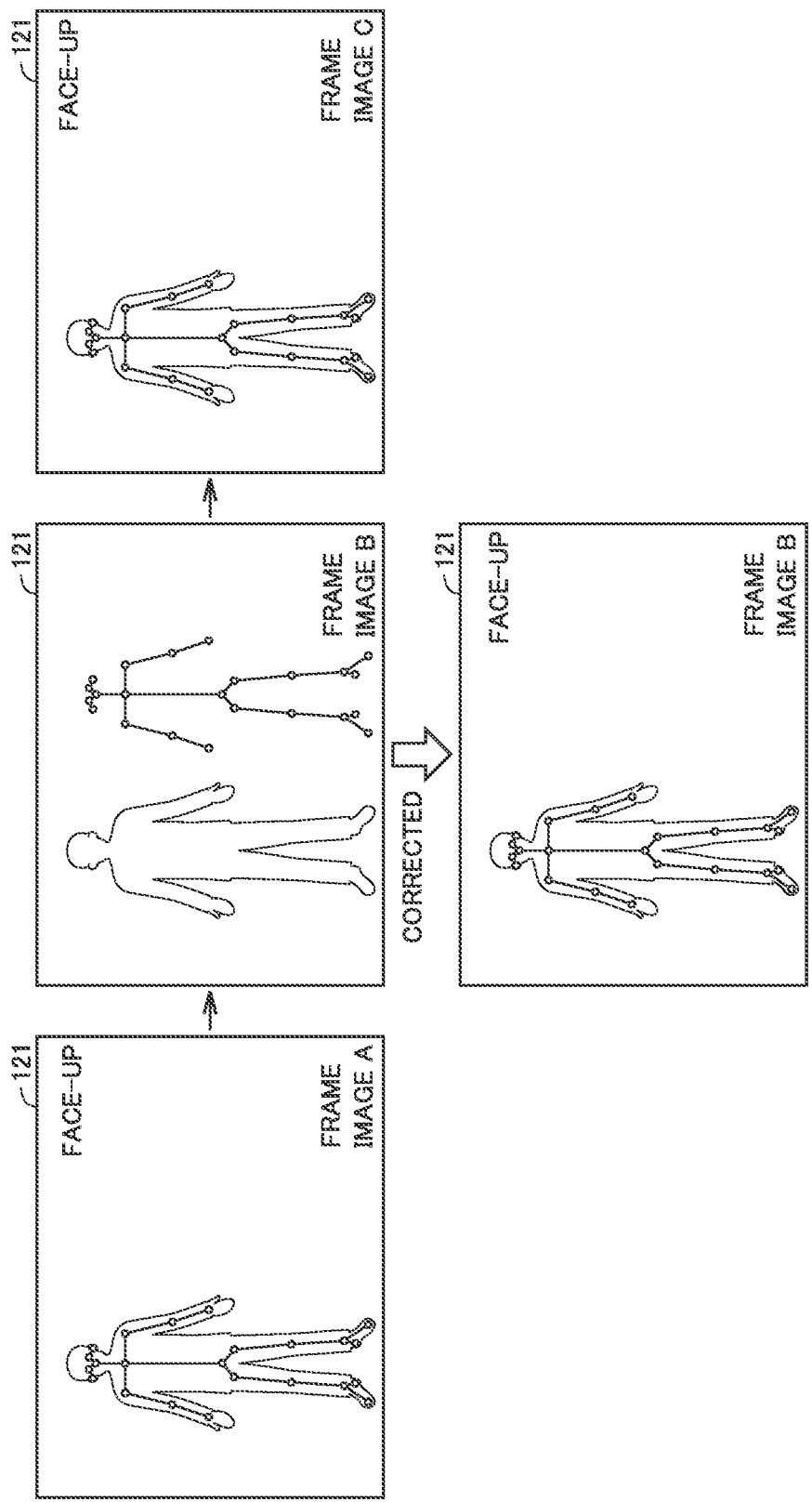
FIG. 12 is a diagram showing exemplary representation of a result of detection.

FIG. 12 shows exemplary representation when the position detection result is determined as being erroneous in frame B, although there is no motion of a person in frame images A to C. As in FIG. 9, as shown in FIG. 12, on display 121, an image of the person who sleeps with his/her face up, the position image, and the character image "face-up" are shown as frame image A on display 121.

In frame image B obtained next, there is no motion of the person. The position detection result, however, is erroneous, and the position image is shown on display 121 as being greatly displaced to the right on a screen. Therefore, the position detection result is determined as being erroneous and the position detection result is corrected. As a result of correction of the position detection result, the position detection result corresponding to immediately preceding frame image A is used. Thus, the corrected position detection result is correctly shown.

Figure 13:
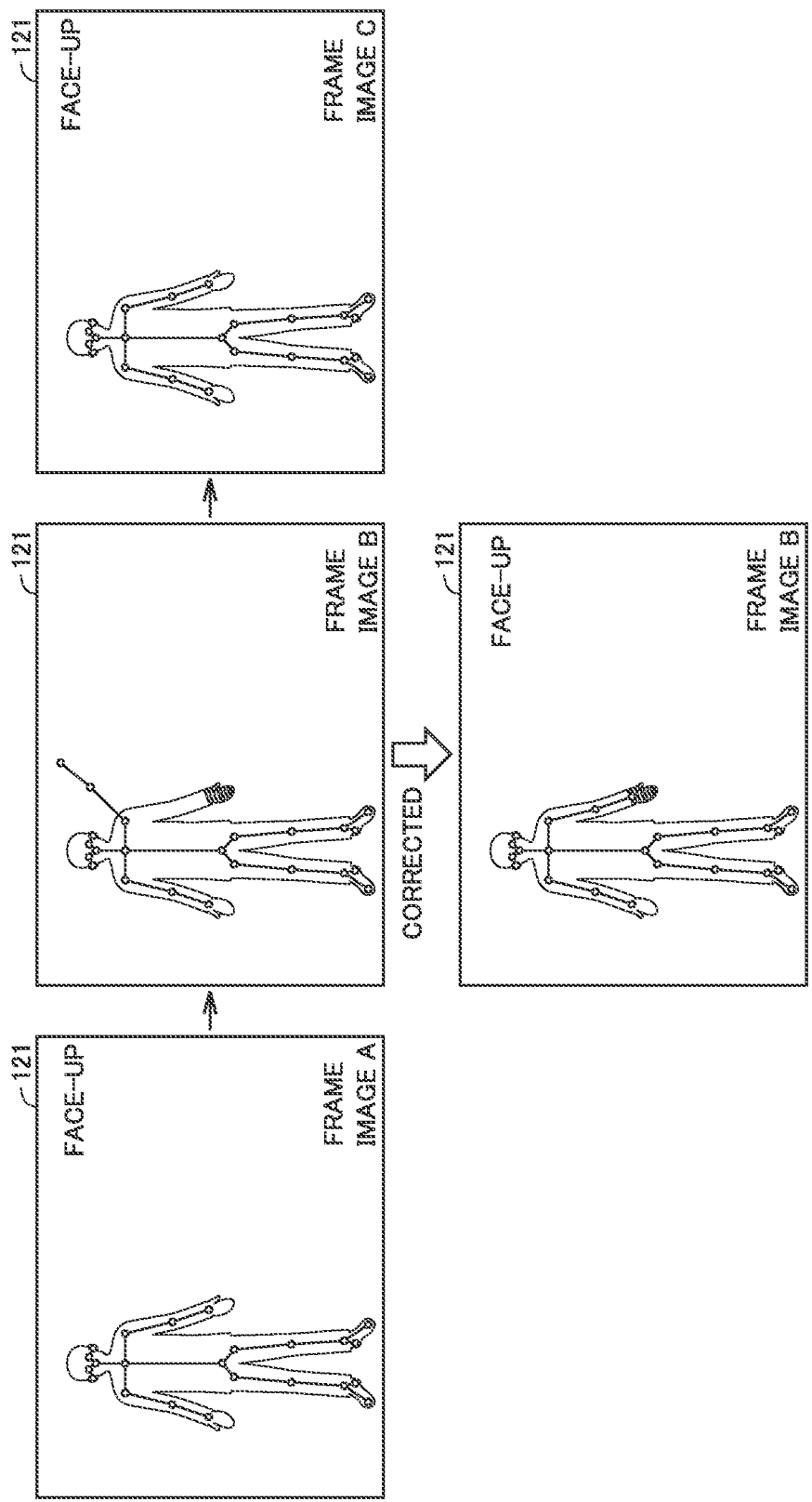
FIG. 13 is a diagram showing exemplary representation of a result of detection.

FIG. 13 shows exemplary representation when there is a motion in a person in frame images A to C and the position detection result is determined as being erroneous in frame B. As in FIG. 9, as shown in FIG. 13, an image of the person who sleeps with his/her face up, the position image, and the character image "face-up" are shown as frame image A on display 121.

In frame image B obtained next, there is a slight motion in the left hand, and hence a differential image that allows identification of the motion of the left hand is shown. Furthermore, the result of detection of positions of the left wrist and the left elbow is erroneous, and a position image where the left arm and hand seem to have greatly moved is shown. In addition, the left arm and hand have moved at a speed impossible as the motion of the person within a period from shooting of frame A until shooting of frame B.

For example, movement of the left arm and hand upward from below within a period shorter than one second is impossible. At this time, based on comparison between frame image A and frame image B, the amount of change in position of the left wrist or the left elbow exceeds a predetermined criterion value, and hence the position detection result is determined as being erroneous.

When the position detection result is determined as being erroneous, the position detection result is corrected. As a result of correction of the position detection result, the position detection result corresponding to immediately preceding frame image A is used. The corrected position detection result is thus correctly shown.

Figure 14:
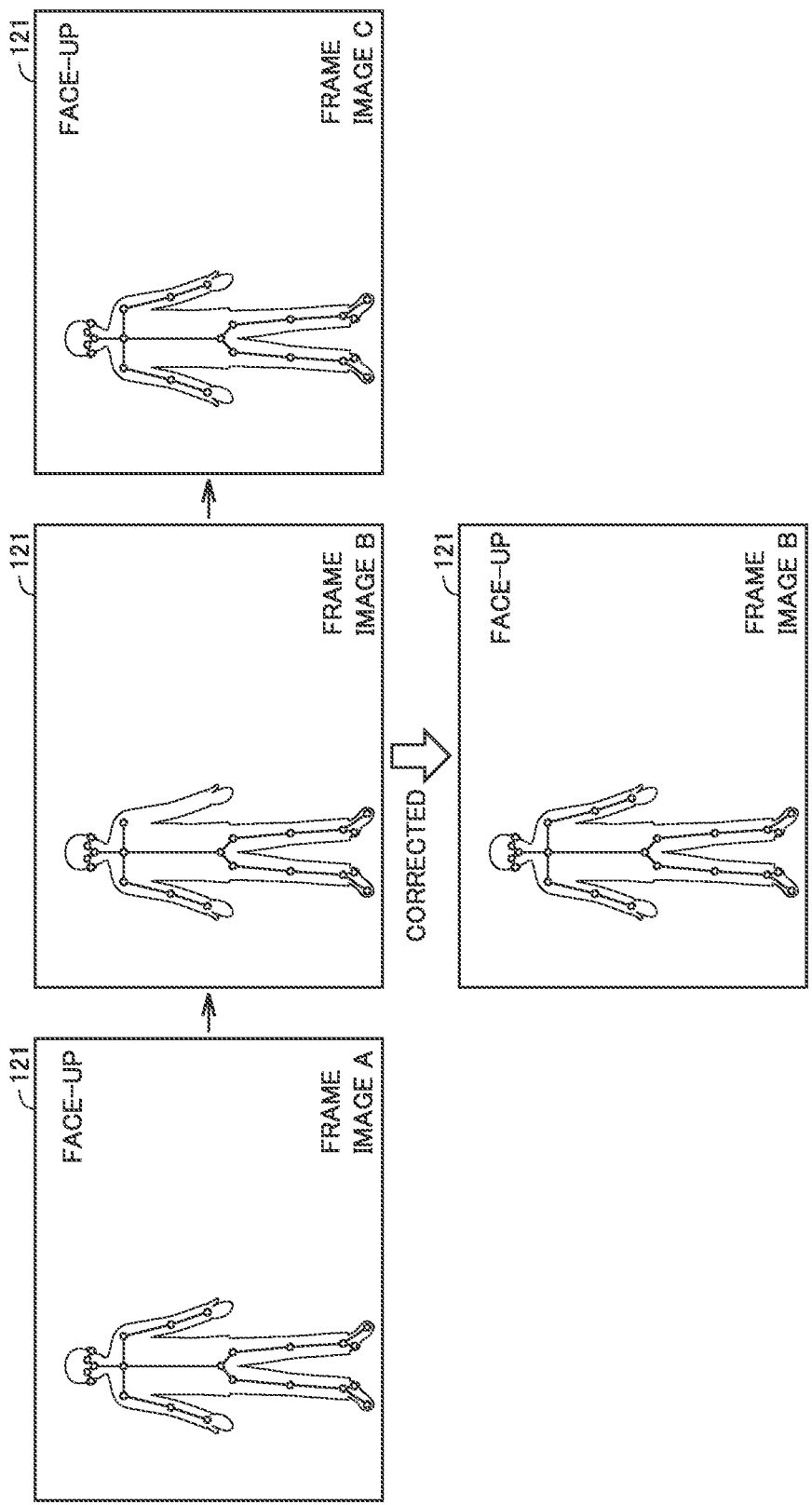
FIG. 14 is a diagram showing exemplary representation of a result of detection.

FIG. 14 shows exemplary representation when there is no motion in a person in frame images A to C, however, at least one position cannot be detected in frame B. As in FIG. 9, as shown in FIG. 14, an image of the person who sleeps with his/her face up, the position image, and the character image "face-up" are shown as frame image A on display 121.

In frame A, all positions are assumed to have been detected. In frame image B obtained next, however, it is assumed that a portion that cannot be detected is produced on the left hand side, although there is no motion of the person. In this case, the position detection result corresponding to immediately preceding frame image A may be used. The corrected position detection result is thus correctly shown.

[As to Error Exclusion Processing]

Figure 15:
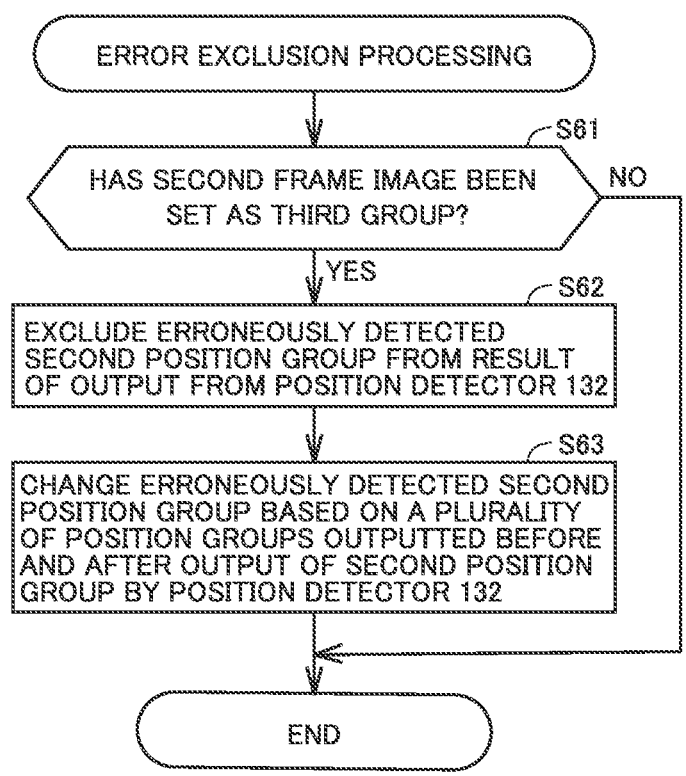
FIG. 15 is a flowchart showing exemplary error exclusion processing according to a modification of the present embodiment.

FIG. 15 is a flowchart showing exemplary error exclusion processing according to a modification of the present embodiment. In the present embodiment, determination processor 133 changes the erroneously detected second position group to positional information the same as that of the first position group. Without being limited as such, determination processor 133 may change the erroneously detected second position group based on a plurality of position groups outputted before and after output of the second position group (present position detection result) by position detector 132.

Specifically, as the error exclusion processing according to the modification is started, in S61, when the presently obtained frame image (second frame image) is set as the third group (YES in S61), determination processor 133 has the process proceed to S62.

In S61, when the presently obtained frame image (second frame image) is not set as the third group (NO in S61), determination processor 133 quits the error exclusion processing. In S62, determination processor 133 excludes the erroneously detected second position group (present position detection result) from the result of output from position detector 132 and the process proceeds to S63.

In S63, determination processor 133 changes the erroneously detected second position group based on a plurality of position groups outputted before and after output of the second position group (present position detection result) by position detector 132. The position detection result may be changed for each detected position of the part of the human body.

For example, a previous position detection result and a next position detection result may linearly be interpolated to calculate the present position detection result. In this case, the present position detection result cannot be corrected unless the next position detection result is outputted. Therefore, representation of the position image on display 121 is delayed by one frame. In an example where a position is not detected in real time but detected based on moving images shot in advance, representation does not have to be provided as being delayed by one frame.

Without being limited as such, a second previous position detection result and a previous position detection result may linearly be interpolated to calculate the present position detection result. The present position detection result may be corrected based on at least three position detection results.

[Aspects]

The embodiment and the modification described above are understood by a person skilled in the art as specific examples of aspects below.

(Clause 1) A posture detection apparatus according to one aspect includes a receiver, a position estimator, and a determination processor. The receiver obtains frame images on a time-series basis. The position estimator outputs, by inputting information obtained from the frame images into a trained model, positional information of a plurality of parts of a human body from the trained model. The determination processor outputs information on erroneous detection by the position estimator. The position estimator outputs a first position group in response to an input of an obtained first frame image, the first frame image being obtained by the receiver, and outputs a second position group in response to an input of an obtained second frame image different from the first frame image, the second frame image being obtained by the receiver. The determination processor outputs the information on erroneous detection by the position estimator based on a degree of difference between the first position group and the second position group and a degree of matching between the first frame image and the second frame image.

According to such a configuration, erroneous detection of positional information of a plurality of parts of the human body can be identified. Since the erroneously detected positional information can thus be eliminated, detection of an operation of the human body that did not actually occur can be prevented.

(Clause 2) The posture detection apparatus described in Clause 1 further includes a first calculator and a second calculator. The first calculator calculates the degree of difference between the first position group and the second position group. The second calculator calculates the degree of matching between the first frame image and the second frame image. The determination processor outputs the information on erroneous detection by the position estimator based on the degree of difference between the first position group and the second position group calculated by the first calculator and the degree of matching between the first frame image and the second frame image calculated by the second calculator.

According to such a configuration, since the first calculator calculates the degree of difference between the first position group and the second position group, the degree of difference between the first position group and the second position group can be determined more accurately than in an example where visual checking by a person is done. Since the degree of matching between the first frame image and the second frame image is calculated, the degree of matching between the first frame image and the second frame image can accurately be determined. Consequently, information on erroneous detection by the position estimator can accurately be outputted.

(Clause 3) In the posture detection apparatus described in Clause 1 or 2, when the determination processor determines that the first position group and the second position group are different from each other based on the degree of difference between the first position group and the second position group and determines that the first frame image and the second frame image match with each other based on the degree of matching between the first frame image and the second frame image, the determination processor outputs information that allows identification of erroneous detection of the second position group by the position estimator as the information on erroneous detection by the position estimator.

According to such a configuration, erroneous detection of the second position group can be identified. Since the erroneously detected second position group can thus be eliminated, detection of an operation of the human body that did not actually occur can be prevented.

(Clause 4) In the posture detection apparatus described in Clause 3, the determination processor outputs information that allows identification of erroneous detection of the second position group by the position estimator as the information on erroneous detection by the position estimator also when the degree of difference between the first position group and the second position group at at least one part of the plurality of parts exceeds a predetermined criterion.

According to such a configuration, erroneous detection of the positional information of the plurality of parts of the human body on the occurrence of extreme change in position can be identified. Since the erroneously detected position information can thus be eliminated, detection of an operation of the human body that did not actually occur can be prevented.

(Clause 5) In the posture detection apparatus described in Clause 3 or 4, the determination processor excludes the erroneously detected second position group from a result of output from the position estimator.

According to such a configuration, erroneous detection of the second position group can be identified and the erroneously detected second position group can be eliminated. Therefore, detection of an operation of the human body that did not actually occur can be prevented.

(Clause 6) In the posture detection apparatus described in Clause 3 or 4, the determination processor changes the erroneously detected second position group to positional information identical to that of the first position group.

According to such a configuration, erroneous detection of the second position group can be identified and the erroneously detected second position group can be replaced with a correctly detected position group. Therefore, detection of an operation of the human body that did not actually occur can be prevented.

(Clause 7) In the posture detection apparatus described in Clause 3 or 4, the determination processor changes the erroneously detected second position group based on a plurality of position groups outputted before and after output of the second position group from the position estimator.

According to such a configuration, erroneous detection of the second position group can be identified and the erroneously detected second position group can be changed based on the correctly detected position group. Therefore, detection of an operation of the human body that did not actually occur can be prevented.

(Clause 8) In the posture detection apparatus described in any one of Clauses 1 to 7, the determination processor classifies the second frame image as the second frame image in a first group based on the degree of difference between the first frame image and the second frame image. The determination processor classifies the second frame image inputted into the position estimator for output of the second position group as the second frame image in a second group based on the degree of difference between the first position group and the second position group. The determination processor identifies the second frame image included in the second group but not included in the first group as the second frame image for which the position estimator erroneously detected the second position group.

According to such a configuration, the determination processor calculates the degree of difference between the first position group and the second position group and calculates the degree of matching between the first frame image and the second frame image. Therefore, the degree of difference between the first position group and the second position group and the degree of matching between the first frame image and the second frame image can be determined more accurately than in an example where visual checking by a person is done.

(Clause 9) A posture detection method according to one aspect includes obtaining frame images on a time-series basis, outputting, by inputting information obtained from the frame images into a trained model, positional information of a plurality of parts of a human body from the trained model, and outputting information on erroneous detection for the outputted positional information of the plurality of parts. The outputting positional information of a plurality of parts includes outputting a first position group in response to an input of an obtained first frame image and outputting a second position group in response to an input of an obtained second frame image different from the first frame image. The outputting the information on erroneous detection outputs information on the erroneous detection based on a degree of difference between the first position group and the second position group and a degree of matching between the first frame image and the second frame image.

According to such a configuration, erroneous detection of positional information of a plurality of parts of the human body can be identified. Since the erroneously detected positional information can thus be eliminated, detection of an operation of the human body that did not actually occur can be prevented.

(Clause 10) A sleeping posture determination method according to one aspect includes the posture detection method described in Clause 9 and outputting sleeping posture information based on outputted positional information of the plurality of parts and outputted information on the erroneous detection.

According to such a configuration, since sleeping posture information can be outputted based on the correctly detected positional information of the plurality of parts of the human body, accuracy in output of the sleeping posture information can be improved.

It should be understood that the embodiment disclosed herein is illustrative and non-restrictive in every respect. The scope of the present invention is defined by the terms of the claims rather than the description of the embodiment above and is intended to include any modifications within the scope and meaning equivalent to the terms of the claims.

REFERENCE SIGNS LIST 100 posture detection apparatus; 101 hard disk; 102 CPU; 103 memory; 104 display interface; 105 peripheral device interface; 106 camera interface; 111 OS; 112 position detection trained model; 113 error exclusion program; 114 sleeping posture detection program; 121 display; 122 mouse; 123 keyboard; 124 camera; 131 receiver; 132 position detector; 133 determination processor; 134 sleeping posture detector

The invention claimed is:

1. A posture detection apparatus comprising:
a receiver that obtains frame images on a time-series basis;
a position estimator that outputs, by inputting information obtained from the frame images to a trained model, positional information of a plurality of parts of a human body from the trained model; and
a determination processor that outputs information on erroneous detection by the position estimator, wherein
the position estimator
outputs a first position group, which includes first positional information of the plurality of parts, in response to an input of an obtained first frame image, the first frame image being obtained by the receiver, and
outputs a second position group, which includes second positional information of the plurality of parts, in response to an input of an obtained second frame image different from the first frame image, the second frame image being obtained by the receiver, and
the determination processor outputs information that allows identification of erroneous detection of the second positional information of the plurality of parts included in the second position group as the information on erroneous detection by the position estimator based on a degree of difference between the first position group and the second position group and a degree of matching between the first frame image and the second frame image.

2. The posture detection apparatus according to claim 1, further comprising:
a first calculator that calculates the degree of difference between the first position group and the second position group; and
a second calculator that calculates the degree of matching between the first frame image and the second frame image, wherein
the determination processor outputs the information on erroneous detection by the position estimator based on the degree of difference between the first position group and the second position group calculated by the first calculator and the degree of matching between the first frame image and the second frame image calculated by the second calculator.

3. The posture detection apparatus according to claim 1, wherein
the determination processor determines that the first position group and the second position group are different from each other based on the degree of difference between the first position group and the second position group and determines that the first frame image and the second frame image match with each other based on the degree of matching between the first frame image and the second frame image.

4. The posture detection apparatus according to claim 1, wherein
the determination processor changes the erroneously detected second position group based on a plurality of position groups outputted before and after output of the second position group from the position estimator.

5. The posture detection apparatus according to claim 1, wherein
the determination processor
classifies the second frame image as the second frame image in a first group based on a degree of difference between the first frame image and the second frame image,
classifies the second frame image inputted into the position estimator for output of the second position group as the second frame image in a second group based on the degree of difference between the first position group and the second position group, and
identifies the second frame image included in the second group but not included in the first group as the second frame image for which the position estimator erroneously detected the second position group.

6. The posture detection apparatus according to claim 1, wherein
the determination processor further outputs the information that allows identification of erroneous detection of the second position group by the position estimator as the information on erroneous detection by the position estimator in response to the degree of difference between the first position group and the second position group of at least one part of the plurality of parts exceeding a predetermined criterion.

7. The posture detection apparatus according to claim 1, wherein
the determination processor excludes erroneously detected second position group from a result of output from the position estimator.

8. The posture detection apparatus according to claim 1, wherein
the determination processor changes the erroneously detected second position group to positional information identical to that of the first position group.

9. A posture detection method comprising:
obtaining frame images on a time-series basis;
outputting, by inputting information obtained from the frame images into a trained model, positional information of a plurality of parts of a human body from the trained model; and
outputting information on erroneous detection for the outputted positional information of the plurality of parts, wherein
the outputting positional information of a plurality of parts includes
outputting a first position group, which includes first positional information of the plurality of parts, in response to an input of an obtained first frame image, and
outputting a second position group, which includes second positional information of the plurality of parts, in response to an input of an obtained second frame image different from the first frame image, and
the information on erroneous detection includes information that allows identification of erroneous detection of the second positional information of the plurality of parts included in the second position group based on a degree of difference between the first position group and the second position group and a degree of matching between the first frame image and the second frame image.

10. The posture detection method according to claim 9, further comprising:
outputting sleeping posture information based on outputted positional information of the plurality of parts and outputted information on the erroneous detection.

* * * * *